Patented Dec. 13, 1938

2,140,469

UNITED STATES PATENT OFFICE 2,140,469

PRODUCTION OF METHACRYL-CONTAINING COMPOUNDS

John William Croom Crawford and James McGrath, Ardrossan, Scotland, assignors to Imperial Chemical Industries Limited, a corporation of Great Britain No Drawing. Application July 8, 1935, Serial No. 30,408. In Great Britain July 9, 1934

13 Claims. (Cl. 260—526)

The present invention relates to new or improved methods for producing and isolating methacrylamide and products obtainable therefrom.

Hitherto methacrylamide has been prepared by treating the nitrile of methacrylic acid with concentrated sulphuric acid and is itself a valuable material for the preparation of other derivatives of methacrylic acid. In the polymerized form it is of value when suitably prescribed as a softening agent or adhesive.

According to United States application Serial No. 684,749, esters of methacrylic acid are produced by treating acetone cyanhydrin with sulphuric acid at a raised temperature and, preferably after a period of heating to a temperature of about 140° C., reacting the mixture with a monohydric alcohol. In United States Patent No. 2,042,458 a modification of the process is described according to which a quantity of water is added to the reaction mixture before or during the reaction with the monohydric alcohol.

We have now found it possible to isolate methacrylamide from the reaction mixture obtained by heating for a period of time to a temperature exceeding 100° C. and up to about 140° C., acetone cyanhydrin with at least one molecular proportion of sulphuric acid calculated on the true acetone cyanhydrin content. According to the present invention, therefore, the reaction mixture is treated for the separation of methacrylamide or methacrylic acid or derivatives thereof, other than the esters of methacrylic acid prepared in the manner claimed in United States application Serial No. 648,749 and U. S. Patent 2,042,458.

As in the case of the preparation of methacrylic esters, the crude reaction products obtained from acetone and hydrocyanic acid in presence of an alkaline catalyst may be used. It is convenient that the acetone cyanhydrin and the sulphuric acid should be allowed to attain a temperature of about 100-110° C. during mixing, and thereafter be heated for about ½ hour to 1 hour at a temperature of 130-135° C. Antipolymerizing agents, for example, copper, sulphur, tannic acid or resorcinol, are desirably present during the heating and it is most convenient to add them at the start.

If it is desired to isolate the methacrylamide, the solution may be cooled, when the methacrylamide crystallizes out and may be filtered off and further purified, for example, by crystallization from water. Alternatively, the whole reaction mass may be dissolved in water and the sulphuric acid removed by neutralization with a hydroxide or carbonate of an alkaline earth metal, e. g. chalk. The solution is then filtered from the insoluble sulphate, and the aqueous solution of methacrylamide is evaporated to obtain the crystalline substance. If it is desired to prepare methacrylic acid, the crude reaction product containing methacrylamide is treated with water and the mixture is heated, whereupon the methacrylic acid formed may be isolated. Salts of methacrylic acid may be obtained by boiling with alkaline or alkaline earth hydroxides a solution of methacrylamide obtained as described after removal of the sulphuric acid as an insoluble sulphate.

In preparing methacrylic acid in this way we find that the best yields are obtained by using between 3 and 5 mols. of water per mol. of methacrylamide and heating at 130° C. for 1-2 hours. However, good yields are obtained if as few as 2 or as many as 6 mols. of water are present.

The following examples illustrate the invention, all parts being by weight.

*Example 1*

170 parts acetone cyanhydrin purified by distillation in vacuo were mixed at a temperature below 100° C. with 200 parts 98% sulphuric acid in presence of 2 parts of flowers of sulphur, with good agitation. The resulting viscous syrup was heated at 130-140° C. for 1 hour and cooled to room temperature when it was dissolved in 1,000 parts of water and filtered. About 2½ parts of polymer were formed, remaining with the sulphur. The filtered solution was treated with 250 parts of powdered calcium carbonate and again filtered; the filtrate was then evaporated in vacuo to dryness when 145 gms. of a residue consisting mainly of methacrylamide was obtained. After recrystallization from benzene the material melted at 107° C.

*Example 2*

To 1,500 parts of 4% oleum containing 4 parts of flowers of sulphur there were added, with constant stirring, 850 parts of crude acetone cyanhydrin containing 87% by weight of the pure cyanhydrin. During the addition the temperature was maintained at 70–80° C. and was then raised to 130–135° C. for 1 hour. After cooling, 1,080 parts of water with 10 parts of tannic acid were added and the mixture boiled under a reflux condenser for 3 hours. On cooling and pouring into 2,000 parts of brine, a top layer consisting of 647 parts of crude methacrylic acid separated.

Example 3

To an agitated mixture of 2,352 parts of 100% sulphuric acid and 2 parts of precipitated metallic copper, were gradually added 1,360 parts of 95% acetone cyanhydrin, the temperature being maintained at 80–85° C. The temperature was then rapidly raised to 130° C. and maintained there for an hour, while the mixture was continually agitated. After cooling to 110° C., 1,152 parts of water were run in and hydrolysis effected by stirring at 130° C. for two hours. The mixture was then cooled to 60° C. and the upper layer consisting of 1,058 parts of 95% methacrylic acid was separated, constituting an 81% yield based on the content of the pure cyanhydrin.

By fractional distillation of the 95% acid, a pure acid fraction containing 99.6% methacrylic acid was obtained between 63° and 67° C. at 13 mm. pressure.

We claim:

1. In a process for the production of methacrylyl containing compounds the steps of treating acetone cyanhydrin with at least one molecular proportion of sulphuric acid at a temperature between 100° C. and 140° C. and isolating methacrylamide from the resulting solution.

2. Process as claimed in claim 1 in which methacrylamide is directly isolated from the reaction mixture by crystallization.

3. Process as claimed in claim 1 in which methacrylamide is isolated from the reaction mixture by crystallization after removal of sulphuric acid as insoluble sulphate.

4. In a process for the production of methacrylyl containing compounds the steps of treating acetone cyanhydrin with at least one molecular proportion of sulphuric acid for ½ to 1 hour at 130°–135° C. and isolating methacrylamide from the resulting solution.

5. Process as claimed in claim 4 in which methacrylamide is directly isolated from the reaction mixture by crystallization.

6. Process as claimed in claim 4 in which methacrylamide is isolated from the reaction mixture by crystallization after removal of sulphuric acid as insoluble sulphate.

7. In a process for the production of methacrylyl containing compounds the steps of treating acetone cyanhydrin with at least one molecular proportion of sulphuric acid at an elevated temperature, further heating the reaction mixture with water and isolating methacrylic acid.

8. Process as claimed in claim 7 in which the heating with water is carried out at 130°–135° C., from 2 to 6 molecules of water per molecule of methacrylamide being present.

9. Process as claimed in claim 7 in which methacrylic acid is isolated by pouring the hydrolyzed reaction mixture into brine and separating the upper layer.

10. In a process for the production of methacrylyl containing compounds the steps of treating acetone cyanhydrin with at least one molecular proportion of sulphuric acid at an elevated temperature, removing sulphuric acid as an insoluble sulphate and further heating the resulting solution with an alkali metal hydroxide.

11. A process for the production of methacrylamide which comprises mixing, at a temperature below 100° C., acetone cyanhydrin with concentrated sulphuric acid and an anti-polymerizing agent, heating the resulting mixture to a temperature between approximately 130 and 140° C. for approximately 1 hour, cooling the reaction mixture to substantially room temperature and subsequently adding water to the reaction mixture and finally filtering and recovering the methacrylamide after evaporation of the filtrate.

12. A process for the production of methacrylamide which comprises mixing at a temperature between 70° C. and 80° C., acetone cyanhydrin and concentrated sulphuric acid, heating the resulting mixture to a temperature between 100° C. and 140° C. and neutralizing the reaction mixture.

13. A process for the production of methacrylic acid amide which consists in treating acetone cyanhydrin with strong sulphuric acid at a temperature above 70° C. but below the temperature at which decomposition of the cyanhydrin employed occurs under reaction conditions, and neutralizing the reaction mixture.

JOHN WILLIAM CROOM CRAWFORD.
JAMES McGRATH.

CERTIFICATE OF CORRECTION.

Patent No. 2,140,469.                                        December 13, 1938.

JOHN WILLIAM CROOM CRAWFORD, ET AL.

It is hereby certified that error appears in the printed specification of the above numbered patent requiring correction as follows: Page 1, first column, line 35, for the serial number "648,749" read 684,749; and that the said Letters Patent should be read with this correction therein that the same may conform to the record of the case in the Patent Office.

Signed and sealed this 31st day of January, A. D. 1939.

Henry Van Arsdale (Seal)                                        Acting Commissioner of Patents.

into 2,000 parts of brine, a top layer consisting of 647 parts of crude methacrylic acid separated.

Example 3

To an agitated mixture of 2,352 parts of 100% sulphuric acid and 2 parts of precipitated metallic copper, were gradually added 1,360 parts of 95% acetone cyanhydrin, the temperature being maintained at 80–85° C. The temperature was then rapidly raised to 130° C. and maintained there for an hour, while the mixture was continually agitated. After cooling to 110° C., 1,152 parts of water were run in and hydrolysis effected by stirring at 130° C. for two hours. The mixture was then cooled to 60° C. and the upper layer consisting of 1,058 parts of 95% methacrylic acid was separated, constituting an 81% yield based on the content of the pure cyanhydrin.

By fractional distillation of the 95% acid, a pure acid fraction containing 99.6% methacrylic acid was obtained between 63° and 67° C. at 13 mm. pressure.

We claim:

1. In a process for the production of methacrylyl containing compounds the steps of treating acetone cyanhydrin with at least one molecular proportion of sulphuric acid at a temperature between 100° C. and 140° C. and isolating methacrylamide from the resulting solution.

2. Process as claimed in claim 1 in which methacrylamide is directly isolated from the reaction mixture by crystallization.

3. Process as claimed in claim 1 in which methacrylamide is isolated from the reaction mixture by crystallization after removal of sulsphuric acid as insoluble sulphate.

4. In a process for the production of methacrylyl containing compounds the steps of treating acetone cyanhydrin with at least one molecular proportion of sulphuric acid for ½ to 1 hour at 130°–135° C. and isolating methacrylamide from the resulting solution.

5. Process as claimed in claim 4 in which methacrylamide is directly isolated from the reaction mixture by crystallization.

6. Process as claimed in claim 4 in which methacrylamide is isolated from the reaction mixture by crystallization after removal of sulphuric acid as insoluble sulphate.

7. In a process for the production of methacrylyl containing compounds the steps of treating acetone cyanhydrin with at least one molecular proportion of sulphuric acid at an elevated temperature, further heating the reaction mixture with water and isolating methacrylic acid.

8. Process as claimed in claim 7 in which the heating with water is carried out at 130°–135° C., from 2 to 6 molecules of water per molecule of methacrylamide being present.

9. Process as claimed in claim 7 in which methacrylic acid is isolated by pouring the hydrolyzed reaction mixture into brine and separating the upper layer.

10. In a process for the production of methacrylyl containing compounds the steps of treating acetone cyanhydrin with at least one molecular proportion of sulphuric acid at an elevated temperature, removing sulphuric acid as an insoluble sulphate and further heating the resulting solution with an alkali metal hydroxide.

11. A process for the production of methacrylamide which comprises mixing, at a temperature below 100° C., acetone cyanhydrin with concentrated sulphuric acid and an anti-polymerizing agent, heating the resulting mixture to a temperature between approximately 130 and 140° C. for approximately 1 hour, cooling the reaction mixture to substantially room temperature and subsequently adding water to the reaction mixture and finally filtering and recovering the methacrylamide after evaporation of the filtrate.

12. A process for the production of methacrylamide which comprises mixing at a temperature between 70° C. and 80° C., acetone cyanhydrin and concentrated sulphuric acid, heating the resulting mixture to a temperature between 100° C. and 140° C. and neutralizing the reaction mixture.

13. A process for the production of methacrylic acid amide which consists in treating acetone cyanhydrin with strong sulphuric acid at a temperature above 70° C. but below the temperature at which decomposition of the cyanhydrin employed occurs under reaction conditions, and neutralizing the reaction mixture.

JOHN WILLIAM CROOM CRAWFORD.
JAMES McGRATH.

CERTIFICATE OF CORRECTION.

Patent No. 2,140,469.  December 13, 1938.

JOHN WILLIAM CROOM CRAWFORD, ET AL.

It is hereby certified that error appears in the printed specification of the above numbered patent requiring correction as follows: Page 1, first column, line 35, for the serial number "648,749" read 684,749; and that the said Letters Patent should be read with this correction therein that the same may conform to the record of the case in the Patent Office.

Signed and sealed this 31st day of January, A. D. 1939.

Henry Van Arsdale (Seal)  Acting Commissioner of Patents.